(12) United States Patent
Walston et al.

(10) Patent No.: US 8,503,666 B1
(45) Date of Patent: Aug. 6, 2013

(54) DETECTION AND PREVENTION OF UNINTENTIONAL PULSE DIALING

(75) Inventors: Robert Allen Walston, Sandy Springs, GA (US); Russell Crisp, Atlanta, GA (US); Derek Winters, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 464 days.

(21) Appl. No.: 12/749,950

(22) Filed: Mar. 30, 2010

Related U.S. Application Data

(60) Provisional application No. 61/165,884, filed on Apr. 1, 2009.

(51) Int. Cl.
*H04M 1/00* (2006.01)
*H04M 3/00* (2006.01)
*H04M 5/00* (2006.01)
*H04M 11/00* (2006.01)

(52) U.S. Cl.
USPC ....... 379/286; 379/100.14; 379/359; 379/904

(58) Field of Classification Search
USPC .............. 379/1.01, 1.03, 1.04, 23, 28, 32.01, 379/32.04, 100.05, 100.06, 100.14, 207.04, 379/207.06, 207.07, 237, 286, 359, 362, 379/182, 184, 194, 195, 281, 418, 904
See application file for complete search history.

(56) References Cited

U.S. PATENT DOCUMENTS

| | | | | |
|---|---|---|---|---|
| 3,993,877 A | * | 11/1976 | Sendyk et al. | 379/357.04 |
| 4,939,777 A | * | 7/1990 | Oka | 379/387.01 |
| 5,909,484 A | * | 6/1999 | Kim | 379/100.14 |
| 2004/0028206 A1 | * | 2/2004 | Freyman et al. | 379/219 |
| 2009/0034690 A1 | * | 2/2009 | Djurovic et al. | 379/1.04 |

* cited by examiner

*Primary Examiner* — Binh Tieu
(74) *Attorney, Agent, or Firm* — Troy A. Van Aacken; Robert J. Starr

(57) ABSTRACT

Methods, systems and apparatuses can be used to detect and prevent invalid or unwanted pulses. In various implementations, pulse information received from a telephony device can be used to identify a duration associated with the pulse. Based upon the duration, a determination can be made whether the pulse is invalid.

20 Claims, 9 Drawing Sheets

US 8,503,666 B1

DETECTION AND PREVENTION OF UNINTENTIONAL PULSE DIALING

TECHNICAL FIELD

This disclosure is generally related to pulse dialing in telephony systems.

BACKGROUND

Currently, broadband networks may be used to provide traditional telephony service over community antenna television ("CATV") or other communications networks using coaxial cable ("coax") or optical fiber cable. For example, ARRIS Group, Inc. offers telephony over cable products known as VOICE PORT® and TOUCHSTONE® cable modems which can interface a media terminal adaptor ("MTA"), or an embedded media terminal adaptor ("EMTA"), with a data network. Unlike traditional telephone systems, which typically consist of a central unit with banks of line cards resident within the central unit, EMTA devices are widely distributed geographically at customers' premises. In some examples, the EMTAs can operate as an autonomous network element for the purpose of network administration and maintenance.

Defective hardware or customer loop conditions can cause an MTA to inaccurately detect dial pulsed digits. In some circumstances, these false detections can cause random or otherwise automated calls to emergency centers.

SUMMARY

Various systems and methods disclosed herein can provide for detection and/or prevention of unwanted pulse dialing, among others. Methods for detecting and/or preventing unwanted pulse dialing can include: receiving a pulse from a telephony device; measuring the duration of the pulse from the telephony device; determining whether the pulse is valid based upon the duration of the pulse; identifying the pulse as an autodialing event based upon the determination.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating various implementations and examples. Moreover, in the drawings, like reference numerals designate corresponding parts throughout the several views.

DETAILED DESCRIPTION

Figure 1:
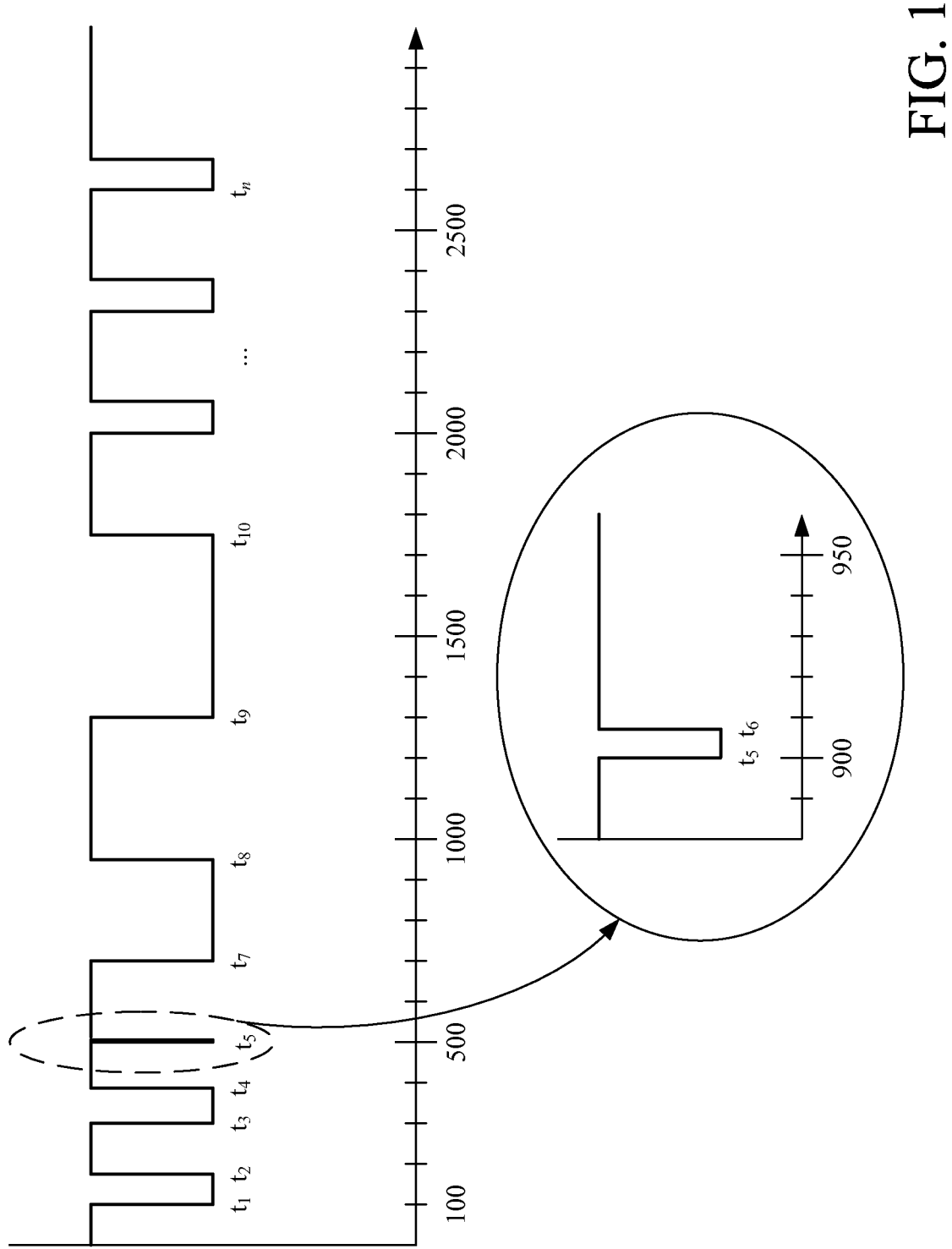
FIG. 1 is timing diagram illustrating example onhook dial pulses, autodialing detections and flash-hook transitions.

Various implementations of this disclosure can provide for detecting and preventing false off-hook and/or on-hook transitions. In some implementations, systems and methods provided herein can solve problems where defective hardware or customer loop conditions cause an EMTA to inaccurately detect dial pulsed digits, which can, for example, potentially result in bogus calls to emergency centers. Dial pulses are created by onhook durations which can produce a falsely detected emergency call. For example in the European Union, the call sequence 1-1-2 is the emergency call number. Thus, onhook periods that are of too short a duration can sometimes be erroneously detected as the dialing sequence 1-1-2.

Autodialing in voice modems (e.g., MTAs) is a widespread problem. One potential concern for providing a solution is the risk of filtering too many legitimate dial pulse phone call attempts. Lower quality phones are not always consistent in their pulse dialing.

Systems and methods for detecting and preventing unwanted pulse dialing can also provide the MSOs with MIBs helps to customize the behavior of the devices. Various implementations can provide a method of 'qualifying' dial pulse digits to determine whether they were intentionally dialed or if they are the result of line card or local loop defects. If it is determined that the digits are the result of defects, the digits caused by defects are squelched and the event is recorded.

It should be understood, a management information base ("MIB") comprises objects that are used to store information. The information stored in a given object at a given time can be referred to as an instance. MIB instances are typically accessed and manipulated using simple network management protocol ("SNMP"), and can be used to provide status of devices that are managed using MIBs. For device management purposes, MIB information can be received via a download from a head end, via a network transfer, via local physical interface, or may be embedded into EMTA device when it is manufactured.

The interface for accessing MIB data typically conforms to standards promulgated by an Internet standards body. However, such standards typically allow customized, private uses of MIB objects. Such uses might not be defined by a standards body, except to the extent that the addressing of a private MIB object should conform to a standard address naming of MIB objects generally. Thus, for example, a standards body assigns the address of a given node of the MIB to a particular manufacturer. The manufacturer can then create its own custom MIB objects that branch from its corresponding manufacturer node. The manufacturer can use the MIBs it creates for its own purposes. Typically, portions of a manufacturer's MIB are kept private by the manufacturer and other portions are known to the public. Making a portion of the MIB public facilitates interoperation of a third party manufacturer's devices with the manufacturer's devices.

For the EMTAs, an SNMP MIB can be implemented so that values for the EMTA are configurable. Additionally, the event reporting mechanism can use either A-link messages causing SWERs, or more typically system log reports (syslogs) are sent to the network event manager. It will be readily appreciated that the values utilized below are merely default values and can be configured for each EMTA via the SNMP MIB.

FIG. 1 is diagram illustrating onhook dial pulses, autodialing detections and flash-hook transitions. In the normal offhook state, the signal is at the high value, and an onhook pulse causes the signal to go to the low value. However, other methodologies and values for onhook and offhook signals may be chosen.

As shown in FIG. 1, a typical onhook pulse begins at $t_1$ and ends at $t_2$. Another onhook pulse is shown from $t_3$-$t_4$. Typically, a valid dial pulse has a duration between 10 ms and 100 ms. Of course, it will be readily appreciated that other dial pulse ranges can identified as valid based upon the characteristics of the system.

An example instance of autodialing is shown at $t_5$ in FIG. 1, and in more detail in the portion blown up in the range from $t_5$-$t_6$. Autodialing and other false detections are typically of too limited a duration to be considered a valid dial pulse. In one exemplary embodiment, valid dial pulses are at least 10 ms. The pulse shown from $t_5$-$t_6$ has a duration less than 10 ms and is therefore recorded as autodialing.

A valid hook-flash pulse is also shown in FIG. 1 at $t_9$-$t_{10}$. A typical hook-flash pulse can have a duration between 300 ms and 700 ms. The hook-flash pulse shown from $t_9$-$t_{10}$ is of approximately 450 ms duration.

Occasionally, an onhook pulse lasts longer than a valid dial pulse, but not long enough for a valid hook-flash. In some implementations, such instances can also be recorded as autodialing. One example is shown at $t_7$-$t_8$, and has approximate duration of 250 ms.

Figure 2:
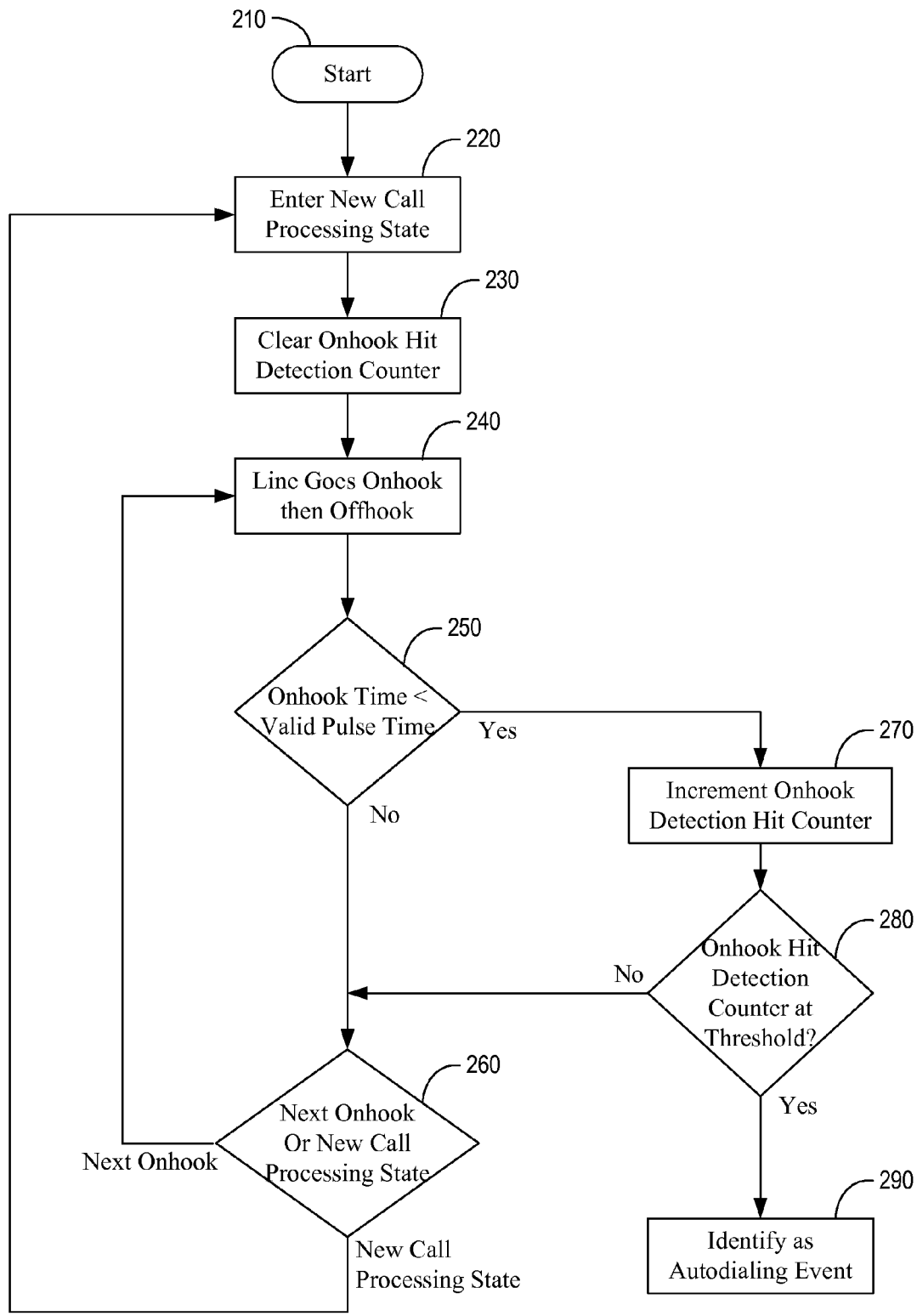
FIG. 2 is a flowchart illustrating a method for detecting onhook transitions that are too short to be a valid dial pulse.

FIG. 2 is a flowchart illustrating an example process 200 for detecting an onhook transition that is too short to be a valid dial pulse within an EMTA, for example. In some implementations, a hit can include an onhook pulse duration that is too short to be considered a valid dial pulse. Such hits can be detected and squelched to prevent erroneous dialing. Additionally, these hits can be recorded as autodialing events.

The process 200 can begin at stage 210. At stage 220, a new call processing state is entered. In some implementations, an EMTA can enter the new call processing state. For example, the user can pick up a phone receiver, thereby signaling to the EMTA that a phone number is about to be dialed.

Once the new processing state is entered, at stage 230 a hit detection counter is set to zero. The hit detection counter can be set to zero, for example, by an EMTA. In some implementations, the hit detection counter provides a count of short onhook periods or detections for a particular call processing state. In telephony, the act of going onhook is also referred to as releasing the line or channel, and can indicate the process of clearing the line. The EMTA going onhook produces a dial-pulse if the onhook period is long enough, while a hit is detected if the onhook is not long enough for a pulse. If the number of hits during a particular state is large enough, it can be inferred that the current new call processing state may be the result of an autodial situation.

At stage 240, an onhook detection is identified. The onhook detection can be identified, for example, by an EMTA. The onhook detection can occur when the line goes onhook followed by the line going offhook again. In some implementations, the onhook detection can signal a flash pulse or a dial pulse. However, if the pulse is shorter than a threshold dial pulse (e.g., 10 ms), the onhook detection is likely not a flash pulse or a dial pulse.

At stage 250, a determination is made whether the onhook period is less than a valid pulse time. The determination can be made, for example, by an EMTA. If the onhook detection is not short enough to be considered a hit, then call processing continues to stage 260 by waiting for the next onhook (e.g., if the detected onhook was a pulse) or for a new call processing state (e.g., if the detected onhook was a flash or long enough to be a hangup). If it is determined to wait for the next onhook, the process 200 returns to stage 240 where an onhook is detected. Alternatively, if it is determined to go to a new call processing state, the process 200 returns to stage 220.

In one implementation, a valid dial pulse falls in the range between 10 ms and 100 ms. Any pulse less than 10 ms can be identified as a hit. It should be understood that the range of values for a valid dial pulse vary according to the particular considerations involved. Both the low end value and the high end value of the valid dial pulse range can vary according to the particular circumstance.

If the onhook time is short enough, and thus considered an onhook detection, then the hit detection counter is incremented at stage 270. The hit detection counter can be incremented, for example, by the EMTA.

At stage 280, a determination is made whether a predetermined hit detection threshold value has been met. The determination can be made, for example, by an EMTA. In various implementations, the hit detection threshold can be set based upon the likelihood that a hit is accidentally detected during a valid outgoing call request. In some implementations, the hit detection threshold can be dynamic and can be based upon a historical number of hit detections during a single call processing state. Alternatively, the hit detection threshold can be set to a static threshold. In some examples, a threshold value can be set to 10 detections within a single call processing state. Of course, it will be readily appreciated that the threshold can be set to any other value (including, e.g., one or zero), based on the circumstances.

If the predetermined threshold value is not exceeded, then call processing continues at stage 260 by waiting for the next onhook or for a new call processing state. If the detection hit counter exceeds the predetermined threshold value, then the onhook detection is recorded as autodialing at stage 290. The onhook detection can be recorded as autodialing, for example, by an EMTA. In some implementations, the EMTA can communicate with a centralized system to report the autodialing event. The centralized system can, for example, communicate with the subscriber to report the defective phone or can record the event to provide backup for subscriber complaints.

The onhook detection hit counter can cleared or zeroed when the call processing state changes, e.g. from 'idle' to 'addressing.'

Figure 3:
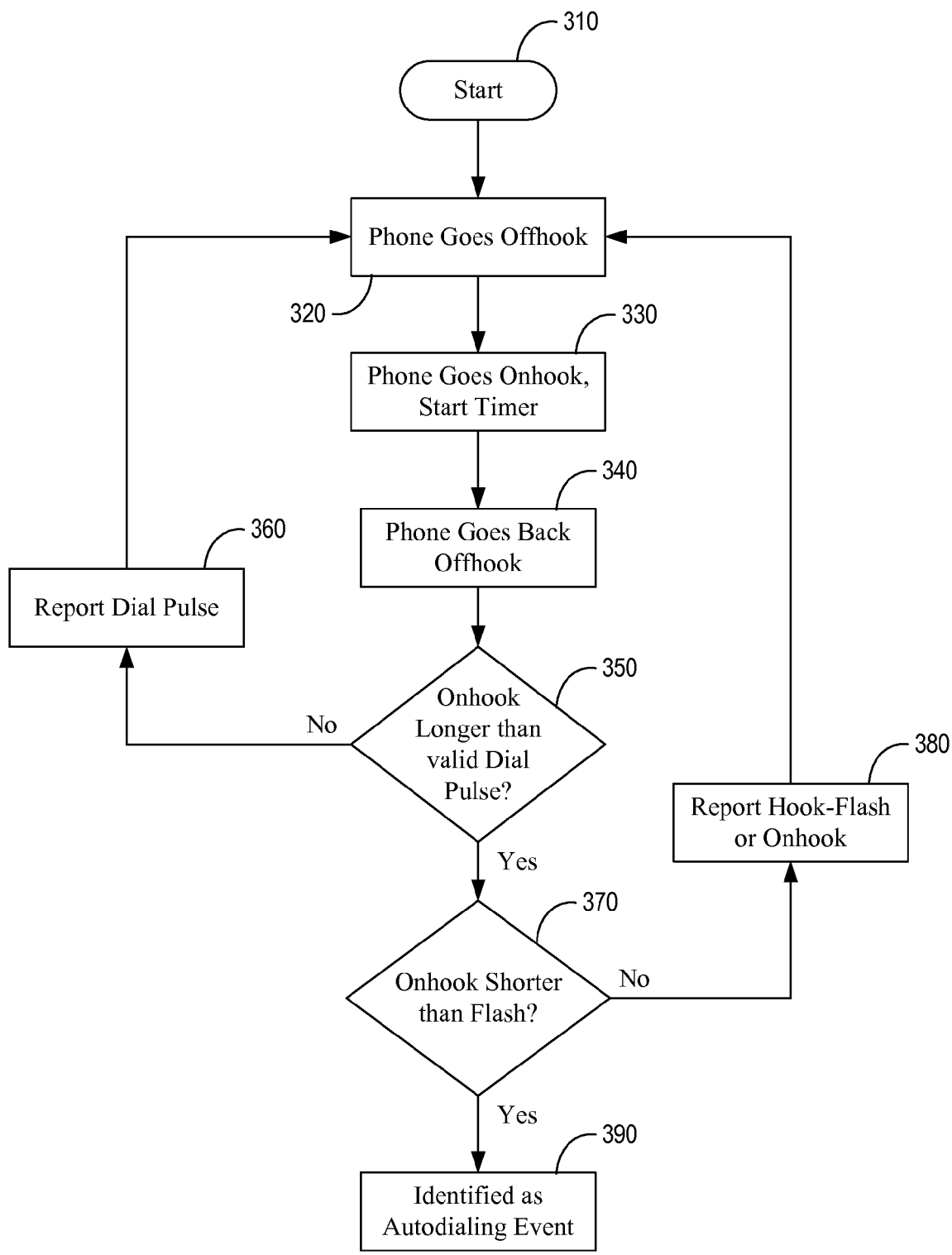
FIG. 3 is a flowchart illustrating a method for recognizing an unintended automatic hook transition.

FIG. 3 is a flowchart illustrating an example process for recognizing an unintended hook transition such as is shown in FIG. 1. As described above, another onhook detection concern is for an onhook condition that lasts too long for a valid dial pulse, but is also too short to be a valid hook flash. This condition is of concern, for example, when an end user telephone or client attempts to perform a hook flash (e.g., such as would be used for call waiting, call forwarding, three way calling, etc.), but does not meet the correct timing requirements. The process 300 begins at stage 310.

Initially a phone goes offhook at stage 320. This offhook can be result of an open line, such as during a conversation, and can be detected by an EMTA. At some point during the offhook call processing state, the phone goes onhook at stage 330 and a timer is started to determine the length of the onhook period. The detection of onhook and start of the timer can be performed, for example, by an EMTA.

At stage 340, the phone is detected to go back offhook. The offhook can be detected, for example, by an EMTA. In some implementations, when the phone goes back offhook, the length of the onhook period is identified.

At stage 350, a determination is made whether the onhook period is longer than a valid dial pulse. The determination can be made, for example, by the EMTA. If the onhook period is not too long (e.g., short enough to be a valid dial pulse), then the dial pulse is reported at stage 360, and call processing continues as normal at stage 320.

If the onhook period is too long for a valid dial pulse, then a determination is made whether the onhook period was shorter than a hook flash at stage 370. If the onhook period was long enough to be a hook flash, then a hook flash is reported at stage 380, and call processing continues as normal at stage 320. If the onhook period was too short to be a hook flash, after having already been determined too long for a valid dial pulse, then the onhook period is recorded as autodialing at stage 390.

In various implementations, a valid dial pulse range can be identified as between 10 ms and 100 ms, and a valid hook-flash can be identified within the range between 300 ms and 700 ms. When a phone goes onhook, a timer is started and then the length of the onhook pulse duration becomes available after the phone goes offhook. If the onhook is within the range for a valid dial pulse (e.g., from 10 ms to 100 ms) a dial pulse is reported. However, if the pulse is longer than 100 ms, then a determination is made whether the onhook pulse duration is a valid hook-flash. If the pulse falls within a valid hook-flash range (e.g., 300-700 ms), then a hook-flash is reported. However, if the onhook pulse duration is between 100 ms and 300 ms, then it is recorded as autodialing. Any onhook pulse duration longer than 700 ms is interpreted as a disconnect, e.g. the caller hung up the phone. It should be understood that the ranges given in this implementation are merely examples of values and ranges that can be used for valid dial pulses and hook-flashes and can vary according to particular circumstances.

Figure 4:
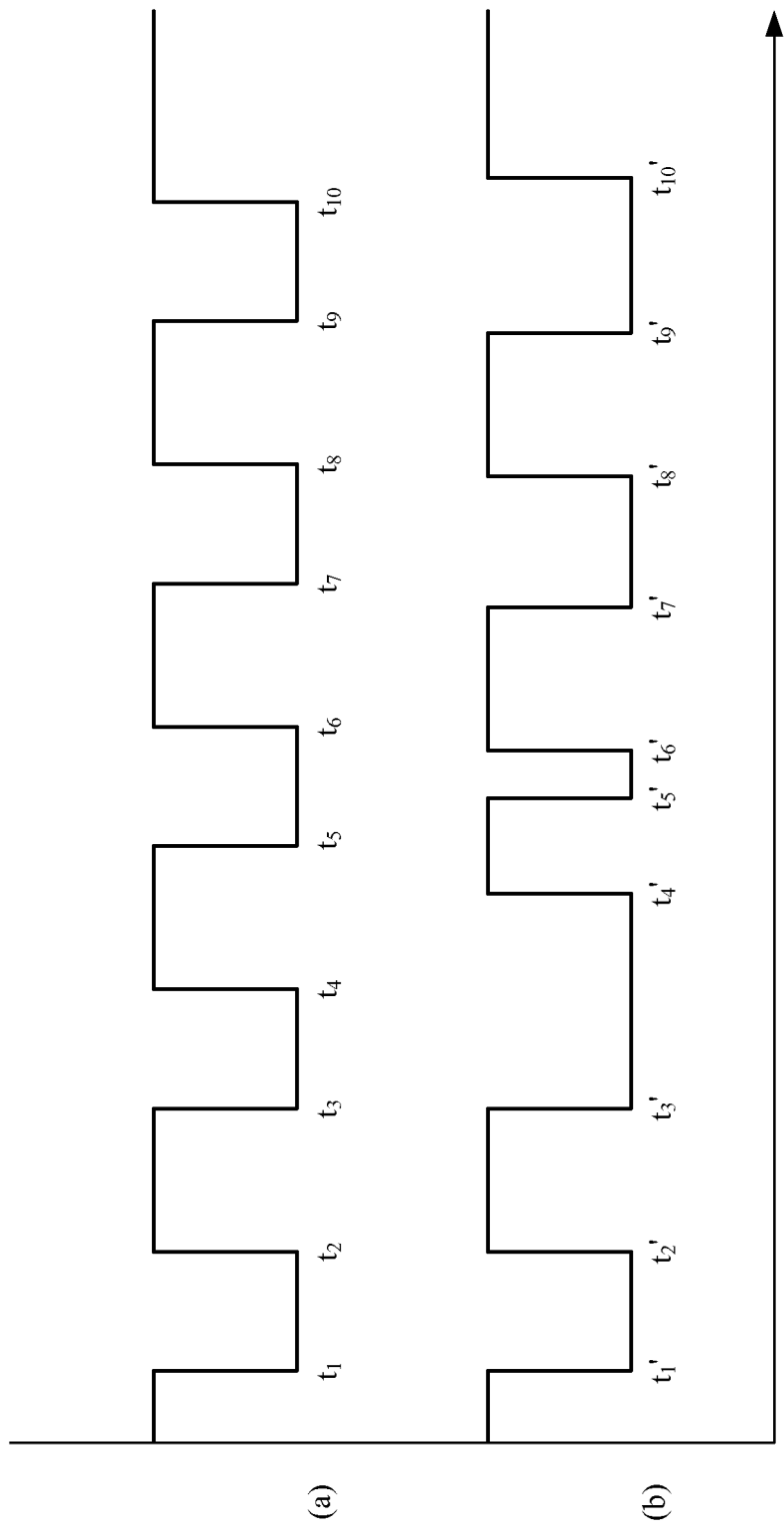
FIG. 4 is a diagram illustrating excessive onhook pulse variability.

FIG. 4 is a timing diagram illustrating an example of detecting variations in onhook pulse duration. Diagram (a) illustrates a sequence of onhook pulses executed when dialing a digit, for example. For example, this timing diagram includes five pulses $t_1$-$t_2$, $t_3$-$t_4$, etc. which can indicate that the digit '5' has been dialed. It should be noted that the onhook pulses (low) are of approximately equal duration in the drawing.

Typically, there is some variability in the actual duration of each onhook pulse, even within the same dialed digit. Diagram (b) illustrates a sequence of onhook pulses where there is variation between the length of the pulses. For example, $t_3'$-$t_4'$ is of much longer duration than $t_1'$-$t_2'$. Similarly, $t_5'$-$t_6'$ is of much shorter duration than $t_3'$-$t_4'$ or $t_{1'-t2}'$. However, if the difference between maximum onhook pulse durations and minimum onhook pulse durations exceeds a specified value, it can be identified as autodialing.

Figure 5:
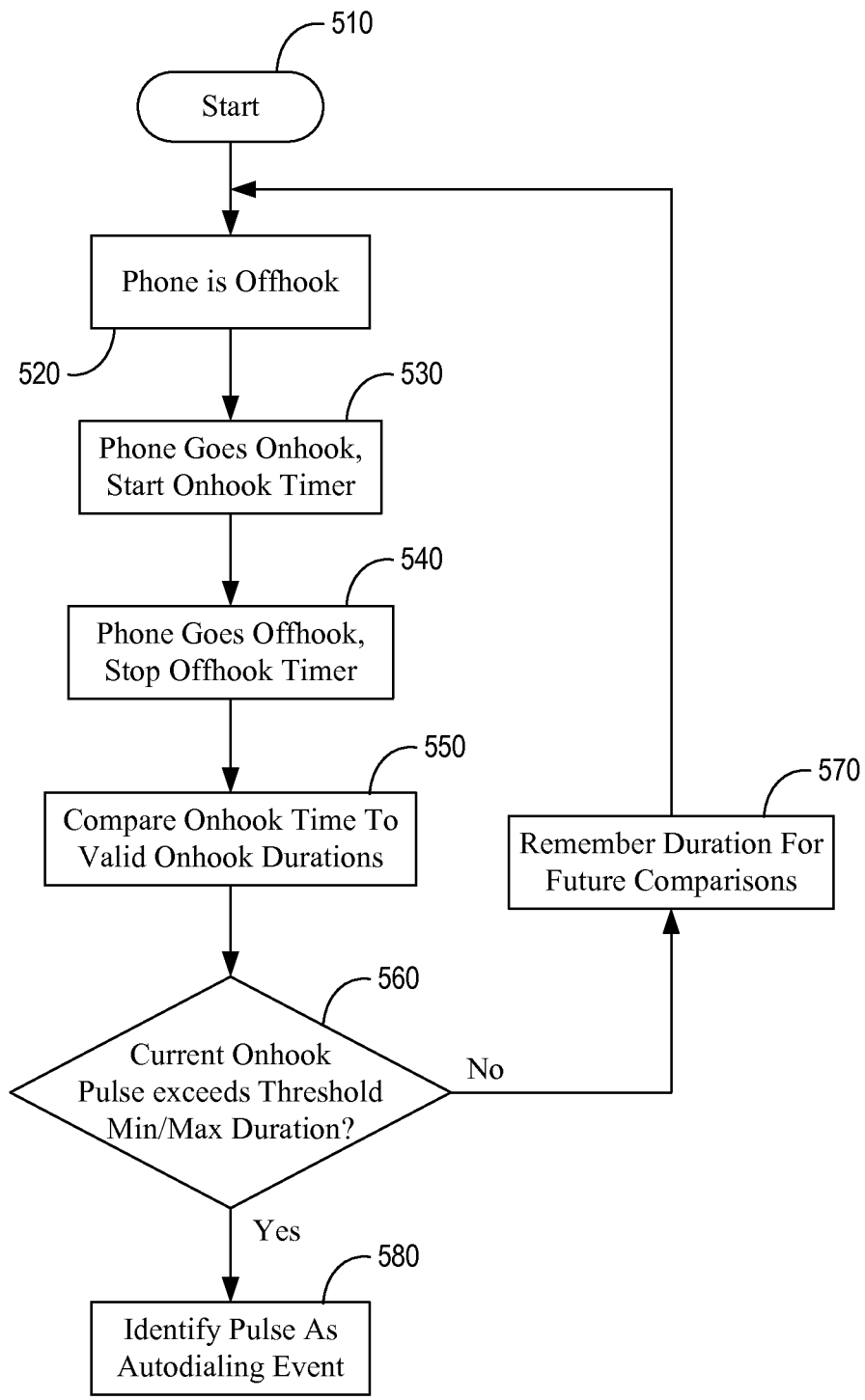
FIG. 5 is a flowchart illustrating a method for recognizing excessive onhook pulse variability.

FIG. 5 is a flowchart illustrating an example process 500 for recognizing excessive onhook pulse variability such as is shown in FIG. 4. Dial pulses are created by onhook durations, which can vary in length. In some implementations, systems and methods for detecting and preventing unwanted dial pulses can provide for detecting when the minimum onhook duration is more than a threshold amount shorter than the maximum onhook duration. It should be understood that there are typical variations in the length of valid dial pulses, but a 20 ms differential between the longest and shortes of valid dial pulses provides for a 25% error on the longest pulse likely to be encountered anywhere in the world. However, it should be understood that an acceptable variation in length between valid dial pulses versus can vary according to a particular phone system or other circumstances, and are within the scope of this disclosure.

In some implementations, various processes (e.g., process 500) can provide for one exemplary embodiment of measuring the length that the phone is onhook between ofthook conditions. This onhook pulse can be compared with previous (e.g., historical) pulses. If the newly calculated onhook period is more than 20 ms shorter than previous dial pulses, then it is recorded as autodialing.

In some implementations, the process 500 starts at stage 510. At stage 520, a phone is identified as offhook. At stage 530, an onhook for the phone is detected and an onhook timer is started. After another ofthook is detected at stage 540, the timer is stopped. The various ofthook and onhook transitions can be detected, for example, by an EMTA.

After stopping the onhook timer, and the onhook time is compared with other onhook durations at stage 550. The comparison of the onhook time with other onhook durations can be performed, for example, by the EMTA. In some implementations, an onhook period that is more than 20 ms shorter and/or longer than average onhook duration can be identified as a minimum and/or maximum threshold for a valid pulse. In some implementations, the average onhook duration can be identified by averaging previous valid onhook durations identified by an EMTA coupled to the device.

The 20 ms onhook period can, for example, identify pulses that vary by 25% from the longest onhook period that would be expected to produce a valid dial pulse. In some implementations, the 20 ms value can be a predetermined value in accordance with expected onhook durations for producing a valid dial pulse. Other predetermined values can be used. For example, different conditions or standards can involve a change in the predetermined value. In other implementations, the maximum variability percentage or time value can be dynamic, and can be set by the historical performance of the phone and expected variability in valid onhook duration derived therefrom. Thus, for example, if a phone typically varies only 5% from an average duration, the maximum variability percentage can be lowered from 25%.

At stage 560 a determination is made whether the duration of the current onhook pulse exceeds the threshold minimum or maximum duration for valid onhook pulses. The determination can be made, for example, by the EMTA. If the onhook period is within normal ranges, then at stage 570, the current onhook duration value is stored or remembered for future comparisons. In such implementations, the onhook duration for actual pulses identified as valid can be used in the calculation to provide the threshold maximum duration for an onhook period.

Returning to stage 560, if the determination is made that the duration of the current onhook pulse is greater than the threshold exceeds a threshold minimum or maximum duration, the pulse is identified as autodialing at stage 580. In some implementations, an EMTA can ignore pulses identified as autodialing. In other implementations, the EMTA can record an identified autodialing event and/or send the autodialing event/notification to a centralized system for review of the event.

Figure 6:
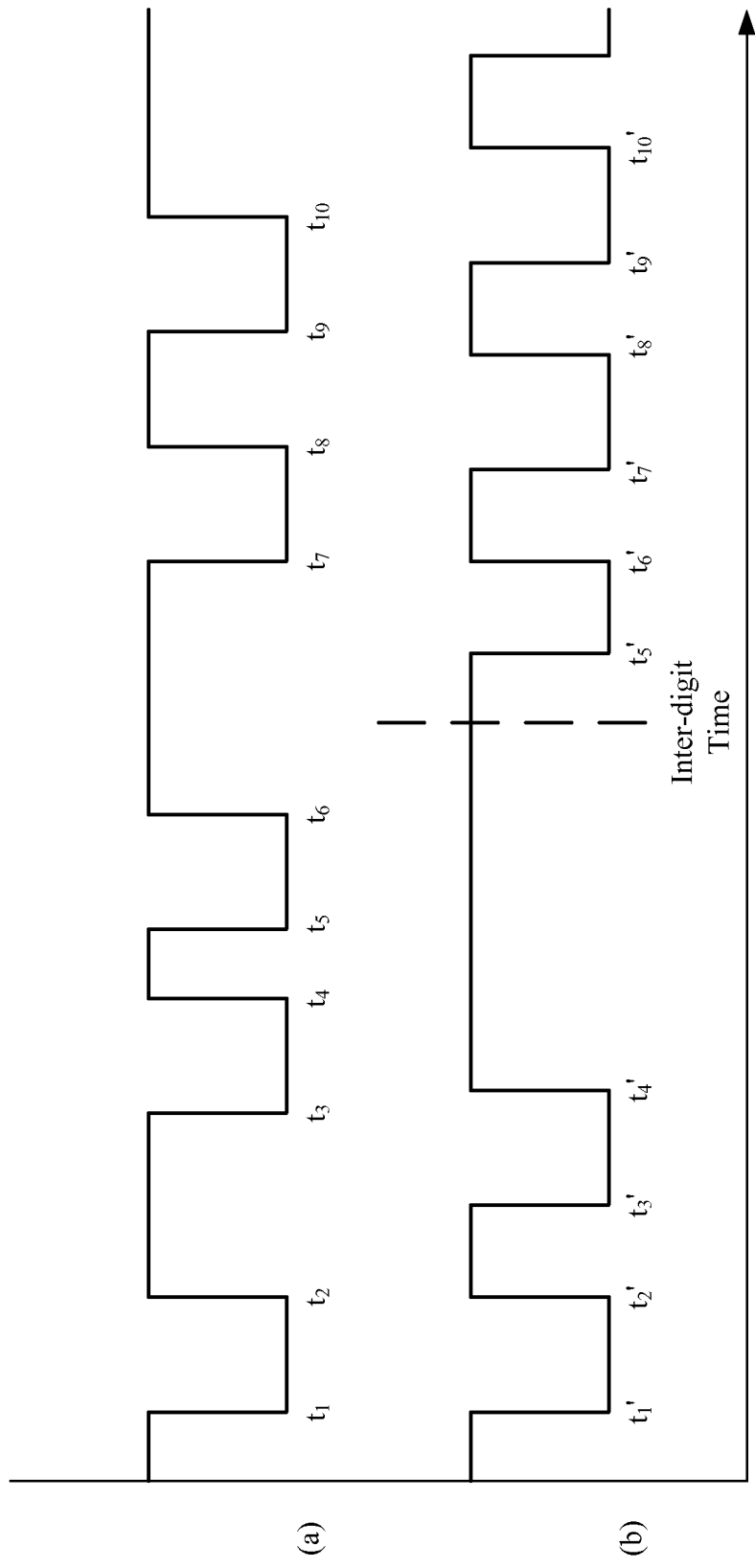
FIG. 6 is a diagram illustrating excessive offhook pulse variability and inter-digit timing.

FIG. 6 is a timing diagram illustrating offhook pulse variability and inter-digit timing. Diagram (a) illustrates a sequence of typical offhook durations between dialed digits. There are five pulses $t_1$-$t_2$, $t_3$-$t_4$, etc. which can indicate that a '5' has been dialed. Diagram (b) illustrates an inter-digit time between dialed digits. The first two onhook dial pulses $t_1'$-$t_2'$ and $t_3'$-$t_4'$, indicate that a '2' has been dialed. A specified minimum inter-digit time occurs between the first dialed digit and the next dialed digit which begins with the onhook dial pulse from $t_5'$-$t_6'$. If the time between successive pulses is too short, then the next pulse detected is identified as being associated with the previous pulses for the current digit rather than the first pulse associated with the next digit. For example, in FIG. 6, the time between $t_4'$ and $t_5'$ is greater than the minimum interdigit time, thus, $t_5'$ can be identified as the beginning of a next digit. If the time between $t_4'$ and $t_5'$ is less than the minimum interdigit time, $t_5'$ can be identified as the continuation of the current digit.

When the difference between maximum offhook pulse durations and minimum offhook pulse durations exceed a specified value, such situations can be identified as autodialing.

Figure 7:
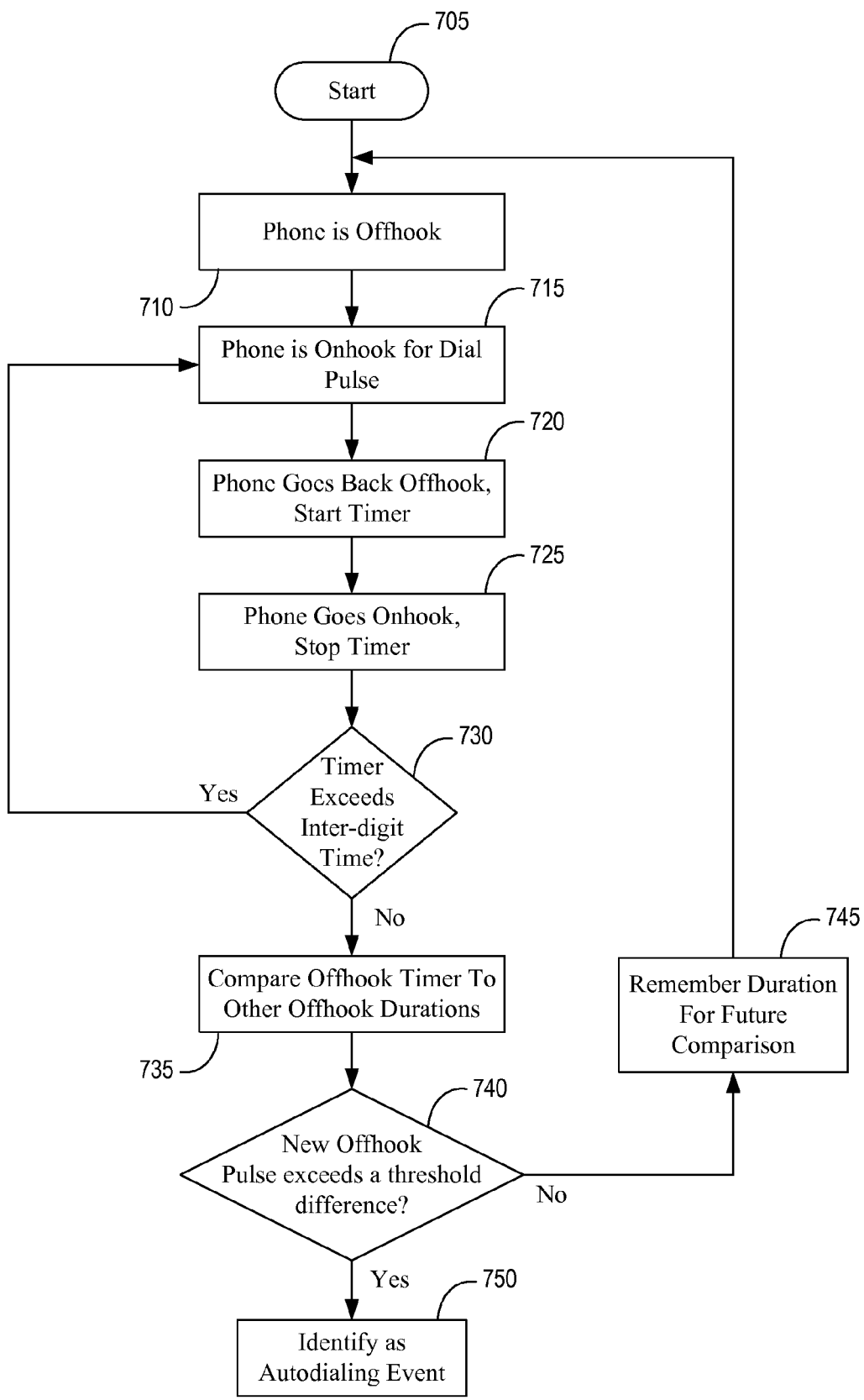
FIG. 7 is a flowchart illustrating a method for recognizing excessive offhook pulse variability.

FIG. 7 is a flowchart illustrating an example process 700 for recognizing excessive offhook pulse variability as shown in FIG. 6. Similar to the excessive onhook pulse variability condition described above, another dialing condition that can occur is excessive offhook pulse variability. Excessive offhook pulse variability can occurs when the minimum offhook duration between valid dial pulses in the same digit differs by a specified amount from expected offhook duration ranges. If the difference between the maximum offhook duration and the minimum offhook duration is too large, then the offhook duration is suspect. In one exemplary circumstance, and for simplicity, the onhook pulse durations fall within typical ranges while the offhook pulse durations vary. In some implementations, an expected value for the difference in offhook duration values is 20 ms. It should be understood that either or both of the onhook pulse durations and/or the offhook durations may vary based upon the implementation details of the system.

The process 700 can start at stage 705. Initially, as shown in FIG. 7, the phone is offhook at stage 710. At stage 715, an onhook is detected for some duration of time. Depending on duration the detected onhook can be used to identify a dial pulse. If the duration qualifies the signal as a dial pulse, at stage 720 an offhook is detected within a specified range of the onhook (e.g., as described with reference to FIG. 5) and the timer is started. At stage 725, the phone is detected as transitioning to onhook again, and the timer is stopped.

At stage 730 a determination is made whether the timer exceeds an inter-digit time. If the timer exceeds the typical time between digits, then it is known that the dial pulses for a current digit are finished and processing returns to stage 715 to monitor for a next digit (the next group of dial pulses).

If the inter-digit timer does not exceed the typical time between digits, then the offhook timer is compared to previous offhook durations at stage 735. The comparison can be made, for example, by an EMTA. In some implementations, the offhook timer can be compared to a threshold difference from an average duration of valid offhook timers. The threshold difference can be expressed, for example, as a percentage difference or an absolute time difference. In other implementations the offhook timer can be compared to a threshold difference from a set of historical high or low valid offhook duration (or average of historical highs and lows). In still further implementations, the offhook timer can be compared to an absolute time range derived from a set of previous valid offhook durations.

At stage 740, a determination is made whether the offhook duration exceeds a threshold difference. The determination of whether the offhook duration exceeds a threshold difference can be identified by a threshold difference can be provided, for example, by an EMTA. If the newly measured offhook duration differs from previous offhook durations by more than a specified value (e.g., 20 ms), then it is recorded as an autodialing event at stage 750. Other values can be specified for the differences in offhook durations based upon the particular characteristics of the system. If the offhook duration is within an expected range, it is stored to be used in future comparisons at stage 745. Actual offhook pulses can provide values for a typical minimum and/or maximum duration of offhook time between successive dial pulses within a digit.

Figure 8:
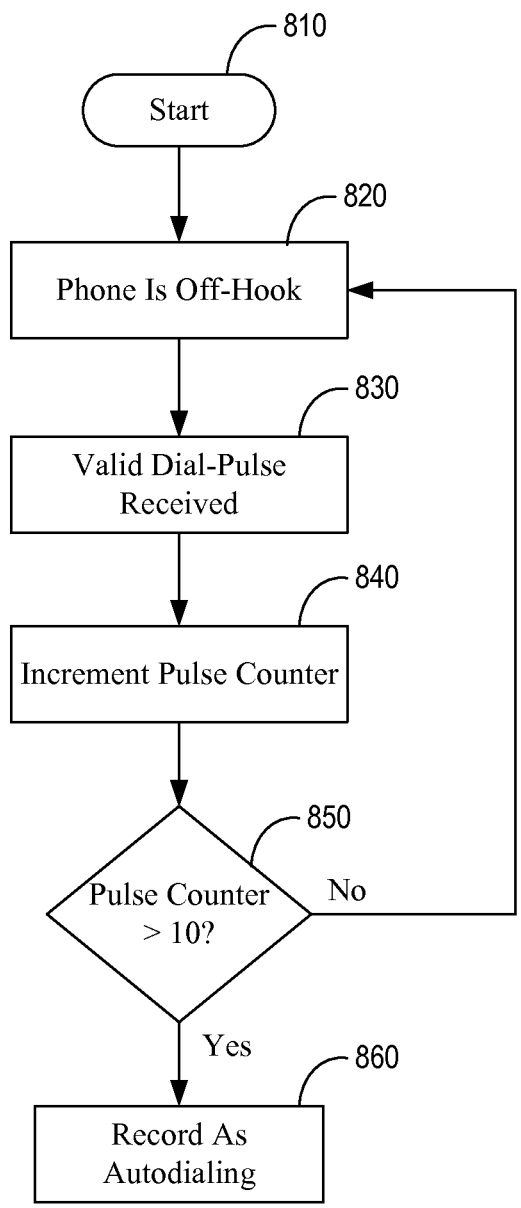
FIG. 8 is a flowchart illustrating a method for detecting too many pulses within a single digit.

FIG. 8 is a flowchart illustrating an example process 800 for detecting too many pulses within a single digit. In some implementations, the dial pulses within a single digit can be counted during normal dialing. Random autodialing typically corresponds to a received digit that is greater than 10 (e.g., zero corresponds to ten dial pulses). For example, if a '1' is dialed, one pulse is counted, if a '5' is dialed, then five pulses are counted, etc. If eleven pulses are counted, then an event can be signaled since an '11' cannot typically be dialed using a single digit on the telephone. In such instances, the occurrence may be recorded as an autodialing event.

The process 800 starts at stage 810. At stage 820, a phone is detected as offhook. The phone can be detected as offhook, for example, by an EMTA. In some implementations, upon detecting the offhook condition, the EMTA can enter a new call processing state. At stage 830, a valid dial-pulse is detected. The valid dial-pulse can be detected, for example by an EMTA. In some implementations, the onhook pulse is validated as a dial-pulse using one or more of the processes described above. Each valid dial-pulse causes an increment in the onhook pulse counter as shown at stage 840.

If an inter-digit delay is found between successive dial pulses, the onhook pulse counter can be reset for each digit. Once the onhook pulse counter exceeds 10 counts, then the event is recorded as autodialing. Other count limits can be applied for determination of autodialing based upon the particular characteristics of a telephone system. Thus, it should be understood that other count limits are within the scope of this disclosure to use different limits to allow for different kinds of autodialing count detections.

For events to be reported to the system there may be a reasonable expectation that the event meets the detection criteria and are not merely a case of someone dropping the phone, for example. Reporting can depend on a count of the number of events, occurrence of a particular type event, or a specified number of events within a specified time frame, for example.

In various implementations, two criteria help to ascertain that detection criteria are met for typical circumstances: (1) upon detection of an event, no dial pulse digits are sent until a solid onhook has been detected so that the phone goes back into the idle state, i.e. until the next phone call (however, certain class features may involve continuing to allow hook flashes to be sent); and (2) the event can be reported if five autodial events are recorded within an hour. These criteria help to greatly reduce the number of false alarms, and a unit that is autodialing typically experiences five events within an hour.

Other limits can be applied for reporting autodial events to a headend. It should be understood that in various implementations, reporting limits can be modified for the particular circumstances of the phone system or other circumstances. In other implementations, autodial events can be reported to a headend if a specified number of events occur within a specified time periods. In still other implementations, the reporting can be dependent upon the types of events rather than the number of events.

Figure 9:
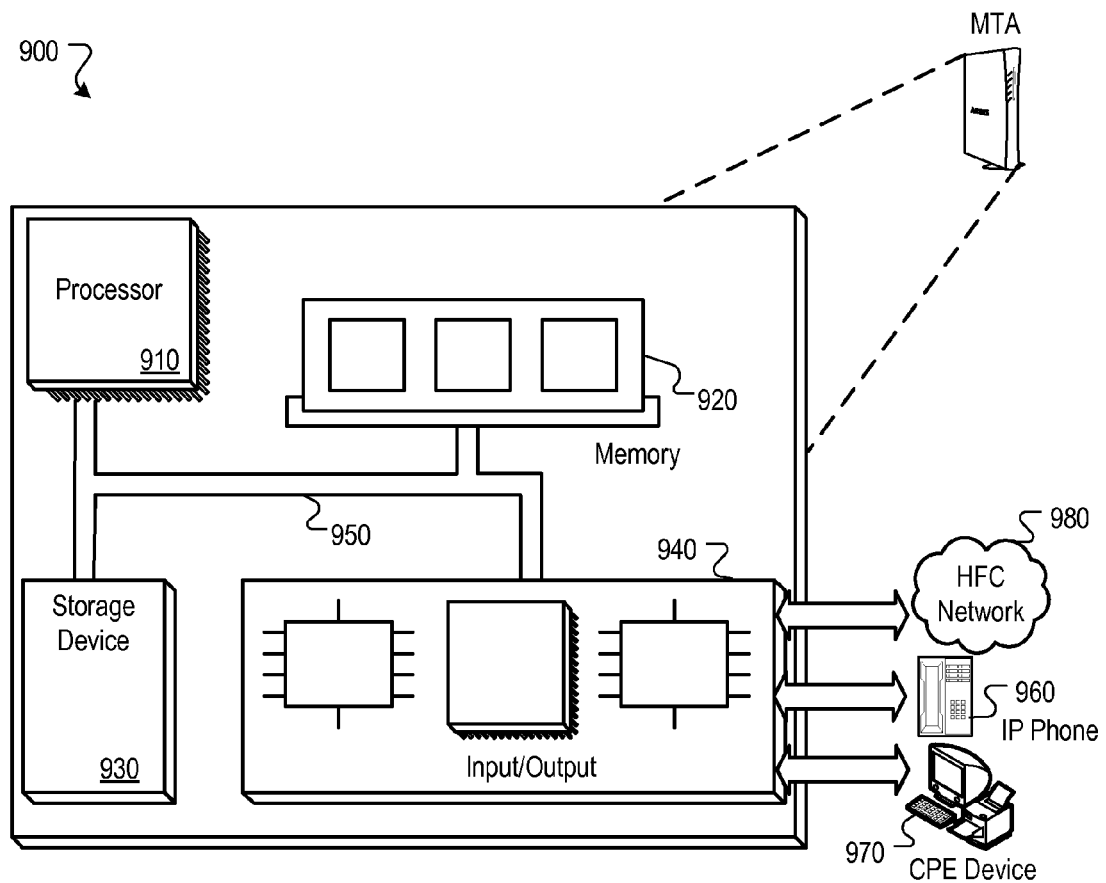
FIG. 9 is a block diagram of a MTA device operable to detect and prevent unintentional pulse dialing

FIG. 9 is a block diagram of a MTA device operable to detect and prevent unintentional pulse dialing. The MTA device 900 operable to detect and prevent unintentional pulse dialing can include a processor 910, a memory 920, a storage device 930, and an input/output device 940. Each of the components 910, 920, 930, and 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the device 900. In one implementation, the memory 920 is a computer-readable medium. In one implementation, the memory 920 is a volatile memory unit. In another implementation, the memory 920 is a non-volatile memory unit.

In some implementations, the storage device 930 is capable of providing mass storage for the device 900. In one implementation, the storage device 930 is a computer-readable medium. In various different implementations, the storage device 930 can, for example, include a hard disk device, an optical disk device, flash memory or some other large capacity storage device.

The input/output device 940 provides input/output operations for the device 900. In one implementation, the input/output device 940 can include one or more of a wireless interface, IP phone 960, CPE device 970, HFC network 980 interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a IP phone 960 and/or CPE device 970), as well as sending communications to, and receiving communications from various networks.

The device (e.g., a MTA device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous. Many modifications and variations are possible in light of the above teachings.

The various implementations were chosen and described in order to explain the principles of detecting and preventing unwanted pulse dialing and its practical application so as to enable others skilled in the art to utilize such systems and methods and various implementations including the various modifications disclosed, among others, as suited to the particular use contemplated. Alternative implementations should become apparent to those skilled in the art to which this disclosure pertains. Accordingly, the scope of the present disclosure is broader than the foregoing description and the implementations described herein.

What is claimed is:

1. A computer-implemented method, comprising:
receiving a pulse from a telephony device;
measuring the duration of the pulse from the telephony device;
determining whether the pulse is valid based upon the duration of the pulse;
identifying the pulse as an autodialing event based upon the determination.

2. The computer-implemented method of claim 1, further comprising detecting an initial offhook transition and entering a new call processing state as a result of the initial offhook transition.

3. The computer-implemented method of claim 1, wherein the pulse is determined to be invalid if the pulse duration is less than 10 milliseconds or between 100 milliseconds and 300 milliseconds.

4. The computer-implemented method of claim 1, wherein an offhook condition causes a high value for a line signal and an onhook condition causes a low value for the line signal.

5. The computer-implemented method of claim 1, further comprising storing the autodialing event to a data store for analysis.

6. The computer-implemented method of claim 1, further comprising sending notification to a central server based upon identification of the autodialing event.

7. The computer-implemented method of claim 1, wherein the method is performed by a media terminal adapter.

8. The computer-implemented method of claim 1, further comprising suppressing autodialing events from being passed onto a network.

9. The computer-implemented method of claim 8, wherein the network is a hybrid fiber-cable network.

10. The computer-implemented method of claim 8, wherein the network is a public switched telephone network.

11. The computer-implemented method of claim 1, further comprising identifying the pulse as a valid dial pulse if the pulse is between about 10 milliseconds and 100 milliseconds in duration.

12. The computer-implemented method of claim 1, further comprising identifying the pulse as a valid hook flash if the pulse is between about 300 milliseconds and 700 milliseconds in duration.

13. The computer-implemented method of claim 1, further comprising identifying an expected range of duration variability of onhook durations for dial pulses based upon previous valid dial pulses.

14. The computer-implemented method of claim 13, wherein the expected range of duration variability is identified as a percentage variation from a function of previously valid pulses.

15. The computer-implemented method of claim 14, wherein the function of previously valid pulses comprises an average of the previously valid pulses.

16. The computer-implemented method of claim 14, wherein the function of previously valid pulses comprises a maximum or a minimum of the previously valid pulses.

17. The computer-implemented method of claim 13, wherein the expected range of duration variability is identified as an absolute time value difference from one or more previous valid pulses.

18. The computer-implemented method of claim 1, further comprising identifying an expected range of duration variability of offhook durations between dial pulses based upon previous offhook durations identified as valid.

19. One or more computer-readable media having instructions stored thereon, the one or more computer readable media, when executed by a processor, causing the processor to perform operations comprising:
receiving a pulse from a telephony device;
measuring the duration of the pulse from the telephony device;
determining whether the pulse is valid based upon the duration of the pulse; and
identifying the pulse as an autodialing event based upon the determination.

20. A system, comprising:
- a communication interface operable to receive incoming communication signals and output outgoing communication signals;
- a system data store capable of storing incoming and outgoing communications and instructions associated with one or more processing elements; and
- a system processor in communication with the system data store and the communication interface, wherein the system processor is operable to execute instructions associated with the one or more processing elements to perform operations comprising:
  - receiving a pulse from a telephony device;
  - measuring the duration of the pulse from the telephony device;
  - comparing the duration of the pulse to a duration associated with one or more valid pulses previously sent from the telephony device;
  - determining whether the pulse is invalid based upon the comparison of the duration of the pulse to the duration associated with one or more valid pulses previously sent from the telephony device; and
  - identifying the pulse as an autodialing event based upon the determination.

* * * * *